United States Patent [19]
Klimek

[11] 3,934,942
[45] Jan. 27, 1976

[54] DUAL CIRCUIT BRAKE VALVE

[75] Inventor: Boleslaw Klimek, Des Plaines, Ill.

[73] Assignee: The Berg Manufacturing Company, Des Plaines, Ill.

[22] Filed: July 22, 1974

[21] Appl. No.: 490,893

[52] U.S. Cl. .................. 303/52; 303/6 C; 303/40
[51] Int. Cl.² ........................................ B60T 15/12
[58] Field of Search ......... 303/52, 54, 50, 40, 6 C, 303/6 R, 28; 137/505.12, 505.18, 510, 627.5; 188/349

[56] References Cited
UNITED STATES PATENTS

| | | | |
|---|---|---|---|
| 3,183,042 | 5/1965 | Bueler | 303/52 |
| 3,291,539 | 12/1966 | Bueler | 303/54 X |
| 3,355,223 | 11/1967 | Klimek | 303/52 |
| 3,390,920 | 7/1968 | Dobrikin | 303/52 |
| 3,450,154 | 6/1969 | Bueler | 303/52 X |
| 3,507,545 | 4/1970 | Page et al. | 303/40 X |
| 3,580,646 | 5/1971 | Ternent | 303/52 |
| 3,712,685 | 1/1973 | Hoffmann | 303/54 X |
| 3,815,961 | 6/1974 | Belart et al. | 303/52 |
| 3,832,015 | 8/1974 | Beck et al. | 303/40 |

Primary Examiner—Trygve M. Blix
Assistant Examiner—Douglas C. Butler
Attorney, Agent, or Firm—Neuman, Williams, Anderson & Olson

[57] ABSTRACT

A brake application valve is used to connect supply tanks to the front and rear brakes of a vehicle. The valve has a pair of shuttle members which normally close communication between the inlets and the outlets and open communication between the outlets and exhaust. There are two pistons, movement of which is effective to cause the shuttle members to open communication between the inlets and outlets and close communication to exhaust. One of the pistons (second piston) has inner and outer portions, with the inner portion being provided with a mechanical connection to the first piston such that movement of the first piston can cause movement of the second piston inner portion. The outer portion of the second piston is exposed to pressure at one outlet to cause movement of the second piston in response to air pressure at the first outlet. The opposite side of the second piston, both the inner and outer portions, is exposed to pressure at the second outlet such that the relationship between the exposed areas determines the relationship between the applied pressures at the first and second outlets.

14 Claims, 2 Drawing Figures

DUAL CIRCUIT BRAKE VALVE

SUMMARY OF THE INVENTION

The present invention relates to a dual foot application valve for use in the air brake system of a tractor-trailer and has particular application to a means for providing differential pressure to two different brake systems in the vehicle.

A primary purpose of the invention is an application valve of the type described in which the ratio between the exposed surfaces of one piston determines the ratio of applied pressures at two valve outlets.

Another purpose is a brake application valve of the type described in which there are a pair of pistons, one for each air system, and a mechanical connection between the pistons.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

Figure 1:
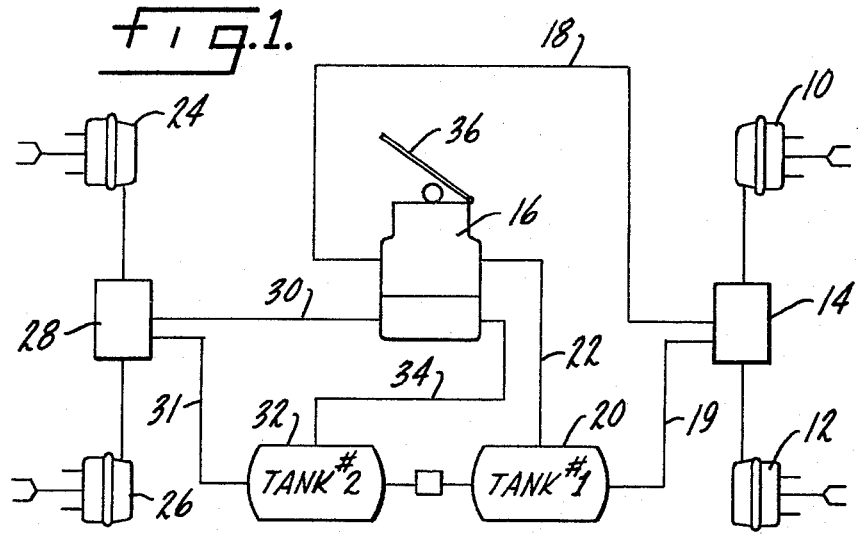
FIG. 1 is a diagrammatic illustration of a portion of a vehicle air brake system.

In FIG. 1 a pair of brake cylinders are indicated at 10 and 12 and are connected by a relay valve 14 to one side of a brake application valve 16 through a line 18. Tank No. 1, indicated at 20, is connected by a line 22 to the opposite side of the brake application valve 16. In like manner, a pair of brake cylinders 24 and 26 are connected through a relay valve 28 and a conduit 30 to the brake application valve 16. Tank No. 2, indicated at 32, is also connected to the brake application valve 16 through a conduit 34. Lines 18 and 30 provide control air signals to operate relay valves 14 and 28. The actual operating air pressure for the brakes is supplied to the relay valves by lines 19 and 31 connected directly to Tank No. 1 and Tank No. 2.

Tank No. 1, upon operation of the application valve 16 by a conventional foot pedal, as indicated at 36, will supply operating air pressure to brake cylinders 10 and 12. In like manner, Tank No. 2, upon the same operation of the foot pedal 36, will supply operating pressure to brake cylinders 24 and 26. The operating air pressure will be controlled by relay valves 14 and 28, which receive control air signals from valve 16 which is supplied with pressure from the tanks.

When there is a rapid application of brakes, it has been found to be necessary to apply greater than normal braking power to the front brakes because of the shift in dynamic load. In a normal application of the brakes most of the weight of a vehicle of the type using the present air brake system will be upon the rear brakes of the tractor, and thus, normally the rear brakes provide greater braking power. Conventionally smaller brake cylinders have been used for the front brakes. However, due to recent Department of Transportation regulations, it is now necessary to provide for the greater application of braking power at the front of the tractor to compensate for the shift in dynamic loading. Accordingly, the present practice is to provide the same size brake cylinders at both the front and rear brakes, and restrict the amount of air pressure applied to the front brakes, except in those situations where there is a change in dynamic loading. The present invention provides, within the brake application valve, a means for restricting the application of pressure to the front brakes, except for those occasions when there is a shift in dynamic loading.

Figure 2:
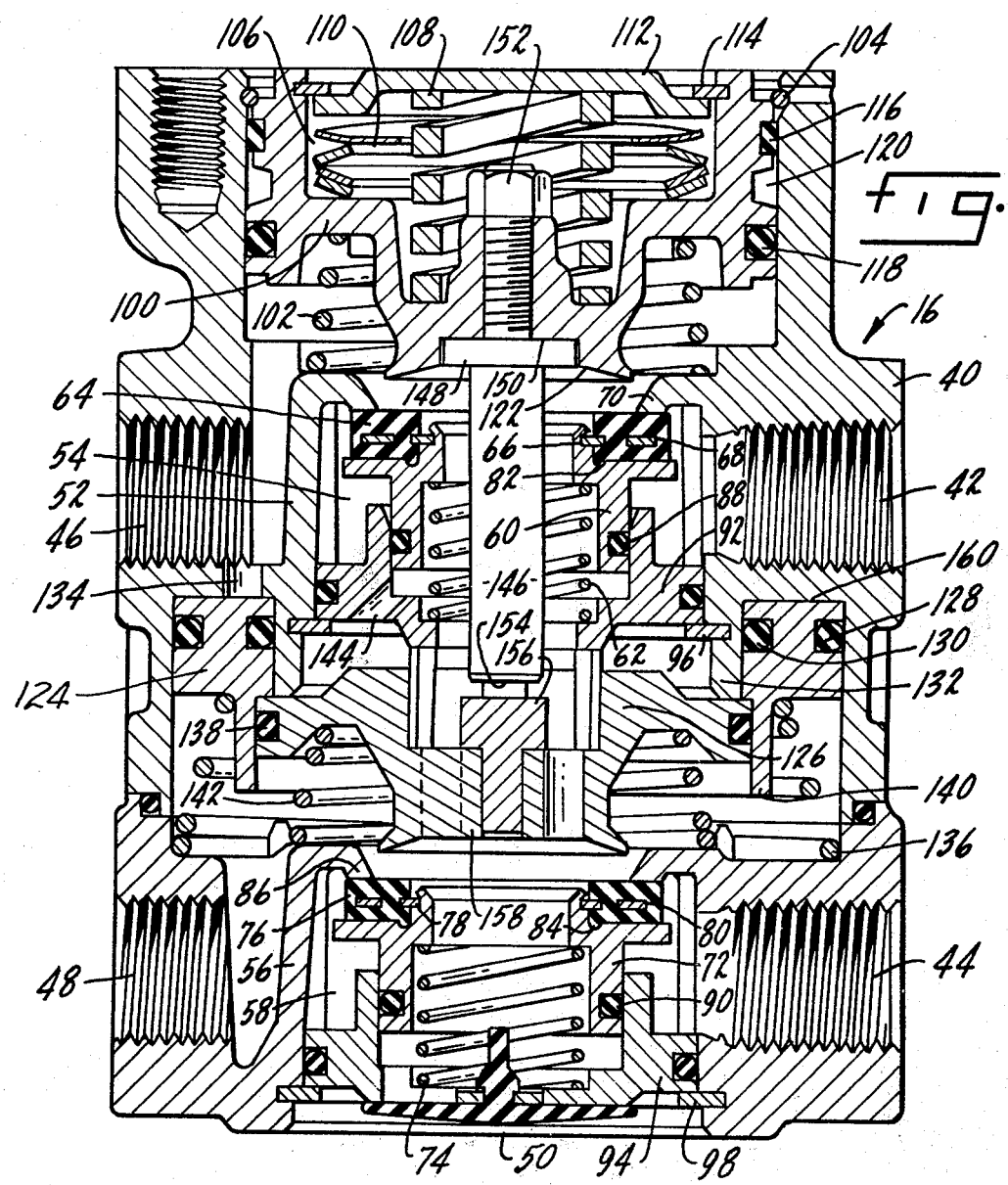
FIG. 2 is a section through a brake application valve of the type disclosed herein.

Valve 16 shown in FIG. 2 includes an outer housing 40 having a first inlet 42, a second inlet 44, a first outlet 46 and a second outlet 48. An exhaust port 50 which opens through the bottom of the outer housing 40 is normally in communication with the first and second outlets 46 and 48, as shown in the position of FIG. 2, so as to allow air pressure within the valve to exhaust.

An inner wall 52 of housing 40 defines a first chamber 54 and a second inner wall 56 defines a second chamber 58. A first shuttle 60 moves within the first chamber 54 and is biased by a return spring 62 to its closed position of FIG. 2 in which a seal member 64 having inner and outer steel rings 66 and 68 is secured to one end of the shuttle and abuts against an inner lip portion 70 of the housing. Likewise, a second shuttle 72 positioned within the second chamber 58 is also urged to the position of FIG. 2 by a return spring 74. The second shuttle 72 also has a seal member 76 containing inner and outer steel rings 78 and 80. The seal members 64 and 76, which may be interchangeable, are fixed in position at the end of their shuttles 60 and 72 by means of their inner steel rings 66 and 78, as well as by protrusions 82 and 84 along the inner edge of the bottom of each seal member, respectively. Seal member 76 seals against a portion 86 of the housing when the second shuttle 72 is in its closed position of FIG. 2. Shuttles 60 and 72 may mount seal rings 88 and 90, respectively, to form seals between the outside surface of the shuttles and inside peripheral surfaces of shuttle retainers 92 and 94. The first shuttle retainer 92 is held in a fixed position within the housing 40 by a retaining ring 96. Likewise, the second shuttle retainer 94 is held in position by its retaining ring 98.

A first piston 100 is spring-biased to its position of FIG. 2 by a return spring 102 which bottoms against the turned-in upper end of wall 52. A retaining wire 104 prevents outward movement of the piston 100. Positioned within a chamber 106 are first and second springs 108 and 110 having different spring rates, both springs being retained within the chamber 106 by a cover 112 which is held in position by a retaining ring 114. The outer surface of piston 100 may have upper and lower seal rings 116 and 118 with an annular groove 120 between them, all for sealing against the interior surface of the housing 40. The lower end of piston 100 is downwardly and outwardly flared to form a contact surface 122 for sealing against the top inner surface of seal member 64 as the piston 100 is moved inwardly upon operation of the valve.

The valve includes a second piston having an outer piston portion 124 and an inner piston portion 126. The outer piston portion 124 has an outer seal 128 bearing against the inside surface of the housing 40 and an inner seal 130 which bears against the outer surface of an annular wall 132 which is integral with the housing. Thus, the outer piston portion is peripherally sealed, both on the inside and outside. A passage 134 connects the top surface or area of outer piston portion 124 with air pressure at outlet port 46. A return spring 136, bottomed against a portion of the housing, normally urges outer piston portion 124 to the position of

FIG. 2.

The inner piston portion 126 has a seal 138 which bears against a skirt 140 of the outer piston portion 124. A coil spring 142, bottomed on housing portion 86, biases inner piston portion 126 to the position of FIG. 2.

There is an exhaust passage 144 extending through shuttle retainer 92 so as to provide a means of connecting port 46 with exhaust when the valve is in the position shown.

A rod 146 has a head 148 bottomed within a recession 150 in the lower surface of first piston 100. Rod 146 may be held in position by a suitable screw or fastening means 152 which extends through the center of first piston 100. The lower surface 154 of rod 146 is slightly spaced from a plug 156 held in position within the inner piston portion 126 by a boss or the like 158. Thus, after initial downward movement of the first piston, the lower surface 154 of rod 146 may strike plug 156, thus causing downward movement of inner piston portion 126.

Outer piston portion 124 has an annular pressure-responsive surface 160 which is in communication with port 46 through passage 134. In like manner, the underside of the second piston, which comprises inner and outer piston portions 126 and 124, has a combined lower surface responsive to air pressure at port 48, which lower surface is that area of the inner and outer piston portions outside of the point of contact of the inner piston portion 126 with seal ring 76. In practice, it has been found to be most advantageous to have this lower air pressure responsive surface twice the cross sectional area of surface 160. Thus, with this relationship, the amount of air pressure applied at port 46 will be twice the pressure applied at port 48. In other words, the air pressure applied to rear brakes 10 and 12 will be twice the pressure applied to front brakes 24 and 26 in normal brake application situations.

In application, and assuming a normal braking situation, the depression of plate 112 will cause spring 108 to move the piston 100 in a downward direction to close upon seal 64. At such time, shuttle 60 will be moved downwardly to open communication between port 42 and port 46. Thus, air pressure will be supplied from Tank No. 1 to relay valve 14 and thus to brake cylinders 10 and 12. Pressure at port 46 will be applied, through passage 134, to pressure-responsive area or surface 160. This will cause downward movement of the second piston inner and outer portions which causes the second piston to close upon seal 76 and thus move shuttle 60 in a downward direction to open communication between port 44 and port 48. Since the pressure-responsive areas have the relationship described above, and since the pressures at inlet ports 42 and 44 are generally equal, the pressure applied at port 48 will be generally half the pressure applied at port 46. Thus, the pressure applied to the front brakes will be generally half that applied to the rear. This is brought about because the lower pressure-responsive area on the combined inner and outer portions of the second piston is generally twice that of the surface 160 which is responsive to air pressure at port 46.

At such time as there is a heavy brake application, plate 112 will provide sufficient downward force to compress both springs 108 and 110. Shuttle 60 will then bottom on shuttle retainer 92 to completely open communication between ports 42 and 46. Similarly, shuttle 72 will bottom on shuttle retainer 94 completely opening communication between ports 44 and 48 and thus applying full pressure to the front brakes. Under normal braking conditions, the pressure applied is modulated by the force applied by plate 112 and spring 108. In heavy brake situations, full braking power is applied to both front and rear brakes.

Rod 146 is effective to cause operation of the second piston inner portion, even if there is no pressure available at port 42 to operate the rear brakes. Thus, upon downward pressure of plate 112, rod 146 will move downwardly, contact plug 156, which will cause the inner piston portion 126 to move downwardly and, as described above, cause the application of pressure from port 44 to port 48 to operate the front brakes. Thus, even though one of the two air brake systems may be inoperative due to a lack of pressure in the tank, the other system can operate.

Whereas the preferred form of the invention has been shown and described herein, it should be realized that there may be many modifications, substitutions and alterations thereto.

The embodiments of the invention in which an exclusive property or privelege is claimed are defined as follows:

1. A brake application valve including a housing having a first inlet and a first outlet, a second inlet and a second outlet and an exhaust outlet, a first shuttle in said housing normally closing communication between said first inlet and outlet, a second shuttle in said housing normally closing communication between said second inlet and outlet, said shuttles normally maintaining communication between said outlets and said exhaust outlet, a first piston in said housing yieldingly urged away from said first shuttle, a second piston in said housing yieldingly urged away from said second shuttle, said second piston having inner and outer concentric portions, mechanical means carried by said first piston and positioned to cause said second piston inner portion to follow inward movement of said first piston, inward movement of both pistons moving said first and second shuttles to open communication between said inlets and outlets and close communication to said exhaust outlet, said second piston inner portion being mounted in sliding engagement with said second piston outer portion and having a surface exposed to fluid pressure appearing at said exhaust outlet, said second piston outer portion having a circumferential surface exposed to fluid pressure at said first outlet to cause movement of said second piston in response to fluid pressure supplied to said first outlet, said second piston inner and outer portions having surfaces exposed to fluid pressure at said second outlet whereby the ratio between the exposed surfaces of said second piston inner and outer portions determine the relationship between pressures applied at said outlets.

2. The structure of claim 1 further characterized in that said second piston outer portion has inner and outer seals in sealing relationship with spaced portions of the housing.

3. The structure of claim 2 further characterized by and including a seal between the outside of the second piston inner portion and the inside of the second piston outer portion.

4. The structure of claim 3 further characterized by and including separate concentrically arranged springs for said second piston inner and outer portions.

5. The structure of claim 1 further characterized in that the surface of said second piston outer portion exposed to fluid pressure at said first outlet is generally one-half the area of said second piston inner and outer portion surfaces exposed to pressure at said second outlet.

6. The structure of claim 1 further characterized by and including a housing inner wall defining an annular chamber, the outer surface of which is formed by said housing, the inner surface being formed by said wall, said second piston outer portion being movable in said chamber.

7. The structure of claim 6 further characterized by and including inner and outer seals carried by said second piston outer portion and bearing against said housing and said housing wall.

8. The structure of claim 7 further including a concentric skirt extending from said second piston outer portion, said second piston inner portion being confined by said skirt and carrying a seal which is in sealing engagement with said skirt.

9. The structure of claim 1 further characterized in that said mechanical means includes a rod concentrically arranged within said housing, seated against said first piston and positioned to bear against said second piston inner portion.

10. The valve of claim 1 further including a coil spring biasing said second piston outer portion away from said exhaust outlet.

11. The structure of claim 10 further characterized in that the surface of said second piston outer portion exposed to fluid pressure at said first outlet is generally equal to one-half of the area of said second piston inner and outer portion surfaces exposed to fluid pressure at said second outlet.

12. A brake application valve including a housing having a first inlet and a first outlet, a second inlet and a second outlet and an exhaust outlet, a first shuttle in said housing normally closing communication between said first inlet and outlet, a second shuttle in said housing normally closing communication between said second inlet and outlet, said shuttles normally maintaining communication between said outlets and said exhaust outlet, a first piston in said housing yieldingly urged away from said first shuttle, a second piston in said housing yieldingly urged away from said second shuttle, said second piston having inner and outer concentric portions, mechanical means carried by said first piston and positioned to cause said second piston inner portion to follow inward movement of said first piston, inward movement of both pistons moving said first and second shuttles to open communication between said inlets and outlets and close communication to said exhaust outlet, said second piston outer portion having a circumferential surface exposed to fluid pressure at said first outlet to cause movement of said second piston in response to fluid pressure supplied to said first outlet, said second piston inner and outer portions having surfaces exposed to fluid pressure at said second outlet whereby the ratio between the exposed surfaces of said second piston inner and outer portions determine the relationship between pressures applied at said outlets, said valve including a housing inner wall defining an annular chamber, the outer surface of which is formed by said housing, the inner surface being formed by said wall, said second piston outer portion being movable in said chamber and including inner and outer seals bearing against said housing and said housing wall and further including a concentric skirt extending outwardly, said second piston inner portion being confined by said skirt and carrying a seal which is in sealing engagement with said skirt.

13. A brake application valve including a housing having a first inlet and a first outlet, a second inlet and a second outlet and an exhaust outlet, a first shuttle in said housing normally closing communication between said first inlet and outlet, a second shuttle in said housing normally closing communication between said second inlet and outlet, said shuttles normally maintaining communication between said outlets and said exhaust outlet, a first piston in said housing yieldingly urged away from said first shuttle, a second piston in said housing yieldingly urged away from said second shuttle, said second piston having inner and outer concentric portions, mechanical means carried by said first piston and positioned to cause said second piston inner portion to follow inward movement of said first piston, inward movement of both pistons moving said first and second shuttles to open communication between said inlets and outlets and close communication to said exhaust outlet, said second piston outer portion having a circumferential surface exposed to fluid pressure at said first outlet to cause movement of said second piston in response to fluid pressure supplied to said first outlet, said second piston inner and outer portions having surfaces exposed to fluid pressure at said second outlet whereby the ratio between the exposed surfaces of said second piston inner and outer portions determine the relationship between pressures applied at said outlets, said valve further including a coil spring biasing said second piston inner portion away from said exhaust outlet and a second coil spring biasing said second piston outer portion away from said exhaust outlet.

14. The structure of claim 13 further characterized in that the surface of said second piston outer portion exposed to fluid pressure at said first outlet is generally equal to one-half of the area of said second piston inner and outer portion surfaces exposed to fluid pressure at said second outlet.

* * * * *